(12) United States Patent
Xia et al.

(10) Patent No.: US 10,142,982 B2
(45) Date of Patent: Nov. 27, 2018

(54) DATA SENDING AND RECEIVING METHOD AND DATA SENDING AND RECEIVING END

(71) Applicant: ZTE CORPORATION, Shenzhen, Guangdong Province (CN)

(72) Inventors: Shuqiang Xia, Shenzhen (CN); Zhirong Lin, Shenzhen (CN); Bo Dai, Shenzhen (CN)

(73) Assignee: XI'AN ZHONGXING NEW SOFTWARE CO., LTD, Shaanxi (CN)

( * ) Notice: Subject to any disclaimer, the term of this patent is extended or adjusted under 35 U.S.C. 154(b) by 119 days.

(21) Appl. No.: 14/889,220

(22) PCT Filed: Mar. 11, 2014

(86) PCT No.: PCT/CN2014/073187
§ 371 (c)(1),
(2) Date: Nov. 5, 2015

(87) PCT Pub. No.: WO2014/180185
PCT Pub. Date: Nov. 13, 2014

(65) Prior Publication Data
US 2016/0143011 A1    May 19, 2016

(30) Foreign Application Priority Data
May 9, 2013 (CN) .......................... 2013 1 0169267

(51) Int. Cl.
*H04W 72/04* (2009.01)
*H04L 1/00* (2006.01)
(Continued)

(52) U.S. Cl.
CPC ........ *H04W 72/044* (2013.01); *H04B 7/0456* (2013.01); *H04L 1/0031* (2013.01); *H04L 5/0048* (2013.01)

(58) Field of Classification Search
None
See application file for complete search history.

(56) References Cited

U.S. PATENT DOCUMENTS

2008/0043867 A1* 2/2008 Blanz .................... H04B 7/063
375/260
2009/0245211 A1* 10/2009 Kim ..................... H04B 7/2615
370/336
(Continued)

FOREIGN PATENT DOCUMENTS

CN        101578776 A    11/2009
CN        101924606 A    12/2010
(Continued)

OTHER PUBLICATIONS

European Search Report dated Mar. 22, 2016 in European Patent Application No. EP14794431.8.
(Continued)

*Primary Examiner* — Bunjob Jaroenchonwanit
(74) *Attorney, Agent, or Firm* — Plumsea Law Group, LLC (57) ABSTRACT

Disclosed are a data transmitting, receiving method, a data transmitting end, and a data receiving end. The transmitting method includes that: a transmitting end codes and modulates a plurality of transport blocks of a same receiving end, wherein a same precoding matrix is used to precode the plurality of transport blocks; the transmitting end maps the plurality of transport blocks onto time-frequency resources of a plurality of subframes; and the transmitting end transmits the plurality of subframes.

9 Claims, 6 Drawing Sheets

(51) Int. Cl.
*H04L 5/00* (2006.01)
*H04B 7/0456* (2017.01)

(56) References Cited

U.S. PATENT DOCUMENTS

| | | | | |
|---|---|---|---|---|
| 2011/0085508 | A1* | 4/2011 | Wengerter | H04L 5/0094 370/329 |
| 2011/0170504 | A1* | 7/2011 | Xu | H04L 5/00 370/329 |
| 2011/0268071 | A1* | 11/2011 | Siew | H04L 1/0003 370/329 |
| 2012/0008524 | A1* | 1/2012 | Amirijoo | H04W 24/10 370/252 |
| 2012/0114014 | A1* | 5/2012 | Gaal | H04B 7/0404 375/135 |
| 2012/0213191 | A1* | 8/2012 | Park | H04L 5/0007 370/329 |
| 2013/0195063 | A1* | 8/2013 | Ahn | H04L 5/0007 370/329 |
| 2013/0336186 | A1* | 12/2013 | Damnjanovic | H04L 12/4633 370/311 |
| 2014/0161067 | A1* | 6/2014 | Lee, II | H04L 5/0023 370/329 |
| 2014/0204863 | A1* | 7/2014 | Wu | H04L 25/0232 370/329 |
| 2014/0226735 | A1* | 8/2014 | Zhang | H04B 7/0452 375/260 |
| 2014/0349697 | A1* | 11/2014 | Zhang | H04B 7/066 455/517 |
| 2015/0029929 | A1* | 1/2015 | Suzuki | H04L 5/0055 370/312 |
| 2015/0256242 | A1* | 9/2015 | Morita | H04L 25/03942 375/267 |
| 2015/0358111 | A1* | 12/2015 | Marinier | H04L 1/0003 370/329 |
| 2015/0358115 | A1* | 12/2015 | Wang | H04W 72/0446 714/776 |
| 2016/0007357 | A1* | 1/2016 | Yano | H04L 1/00 370/329 |
| 2016/0183289 | A1* | 6/2016 | Qiang | H04W 72/1273 370/280 |
| 2016/0198419 | A1* | 7/2016 | Blanz | H04J 13/0044 370/252 |
| 2016/0218798 | A1* | 7/2016 | Yang | H04L 1/1685 |
| 2016/0226642 | A1* | 8/2016 | Aiba | H04L 5/001 |
| 2017/0055115 | A1* | 2/2017 | Uga | H04W 64/00 |
| 2017/0078005 | A1* | 3/2017 | Jongren | H04B 7/0632 |
| 2017/0078976 | A1* | 3/2017 | Seo | H04W 52/146 |

FOREIGN PATENT DOCUMENTS

| | | |
|---|---|---|
| CN | 102742209 A | 10/2012 |
| CN | 102801509 A | 11/2012 |
| WO | 2011056016 A2 | 5/2011 |
| WO | 2011129628 A2 | 10/2011 |

OTHER PUBLICATIONS

International Search Report and Written Opinion dated Jun. 18, 2014 in PCT Application No. PCT/CN2014/073187.

* cited by examiner

DATA SENDING AND RECEIVING METHOD AND DATA SENDING AND RECEIVING END

CROSS-REFERENCE TO RELATED APPLICATION(S)

This application is the U.S. National Phase application of PCT application number PCT/CN2014/073187 having a PCT filing date of Mar. 11, 2014, which claims priority of Chinese patent application 201310169267.9 filed on May 9, 2013, the disclosures of which are hereby incorporated by reference.

TECHNICAL FIELD

The present document relates to the communication field, and particularly, to a data transmitting, receiving method, a data transmitting end, and a data receiving end.

BACKGROUND OF RELATED ART

Uplink physical channels of Long Term Evolution (LTE) system include a Physical Random Access Channel (PRACH), a Physical Uplink Shared Channel (PUSCH), and a Physical Uplink Control Channel (PUCCH). The uplink of the LTE adopts the single-carrier Orthogonal Frequency Division Multiplexing (OFDM) technique, and the reference signal and the data are multiplexed together by means of Time Division Multiplexing (TDM).

While downlink physical channels of the LTE include a Physical Downlink Shared Channel (PDSCH), a Physical Downlink Control Channel (PDCCH), a Physical Broadcast Channel (PBCH), a Physical Multicast Channel (PMCH), a Physical Control Format Indicator Channel (PCFICH), a Physical Hybrid ARQ Indicator Channel (PHICH), and an Enhanced Physical Downlink Control Channel (EPDCCH).

In the LTE system, uplink control information and downlink control information are transmitted by the PUCCH and PDCCH respectively. Wherein the PUCCH is used to transmit the uplink control information (UCI) including a Scheduling Request (SR), a positive acknowledgement/negative acknowledgement (HARQ-ACK/NACK) of the Physical Downlink Shared Channel (PDSCH) and Channel State Information (CSI) fed back by a UE. Wherein the CSI further includes three forms: a Channel Quality Indication (CQI), a Precoding Matrix Indicator (PMI) and a Rank Indication (RI). There are two ways to transmit the CSI: a periodic CSI and an aperiodic CSI, wherein after an eNB has configured the periodic CSI through a high-layer signaling, a UE transmits the CSI at a certain time interval in the fixed ways, while the aperiodic CSI is that the eNB triggers the aperiodic CSI through DCI, the UE transmits the CSI after receiving the DCI.

The PDCCH is configured to transmit Downlink Control Information (DCI), the DCI is mainly used to schedule the PDSCH and the PUSCH, and after receiving the DCI, the UE receives the PDSCH transmitted by an Evolved-NodeB (eNB) according to the DCI indication or transmits the PUSCH to eNB according to the DCI indication. Resource block assignment information, a Modulation and coding scheme (MCS), a Downlink Assignment Index (DAI), a Channel State Information request, Cyclic shift for DM RS and OCC index and Transport Block Size (TBS), etc. are mainly included in the DCI, and after receiving the above described DCI, the UE receives the PDSCH transmitted by the eNB or transmits the PUSCH to the eNB according to the DCI indication.

The above described TBS represents the size of the transport block. In order to improve the system frequency spectrum efficiency, the Multiple-Input Multiple-Output (MIMO) technique is introduced in the LTE system, and multiple-antenna units are adopted at both transmitting end and receiving end in a wireless system, which takes advantage of the rich spatial multi-dimensional characteristic of the wireless scattering channel and works by means of multiple-transmitting ends and multiple-receiving ends to achieve the effect of improving the system channel capacity. After the MIMO is introduced, each carrier can support the multiplexing transmission of a plurality of Transport Blocks (TB), and the eNB needs to inform the TBS of each TB to the UE.

When the DCI schedules the UE to transmit an uplink subframe, the DAI is referred to as UL DAI which represents the number of the ACKs required to be fed back in the uplink subframe to be transmitted by the UE; and when the DCI schedules the UE to receive a downlink subframe, the DAI is referred to as DL DAL which represents that which order of the current subframe is in downlink subframes scheduled in a scheduling window.

The related LTE system includes two kinds of scheduling which are dynamic scheduling and semi-persistance scheduling (SPS), wherein the dynamic scheduling is that the eNB schedules the UE according to related communication requirements, that is, the eNB transmits one DCI, the UE receives one PDSCH or transmits one PUSCH according to the current DCI; and the semi-persistance scheduling (SPS) is that the eNB activates the SPS through the DCI, and after the SPS is activated, the UE receives the PDSCH or transmits the PUSCH at the fixed interval without being informed by the eNB using the DCI, until the eNB uses the DCI to activate the SPS, but in related LTE standards, the maximum MCS limit for the SPS scheduling is 15.

In the LTE protocol of Release 9 (Rel-9), the downlink Single user Multiple-Input Multiple-Output (SU-MIMO) technique is introduced in order to improve the system frequency spectrum efficiency, and in the related LTE protocol, the number of transmission antennas for the eNB is up to 8, and the number of the transport blocks in transmission is up to 2, while in LTE protocol of Release 10 (Rel-10), the uplink SU-MIMO is introduced, and in the related LTE protocol, the number of the uplink transmission antennas for the UE is up to 4, and transport blocks in uplink transmission is up to 2.

In the LTE standard, a base station can schedule transmission of 2 transport blocks in one subframe through one DCI, and an MCS, a New Data Indicator (NDI) and a Redundancy version (RV) of the 2 scheduled transport blocks can be indicated respectively.

In the related technique, when transmitting a plurality of transport blocks, the transmitting end uses different precoding to perform coding and modulation for the different transport blocks, which, to certain extent, causes the reduced system performance of the transmitting end and the receiving end, and cannot meet the requirements.

SUMMARY OF THE INVENTION

The embodiments of present invention provide a data transmitting, receiving method a data transmitting end and a receiving end, to solve the problem of low system efficiency when multiple related transport block are transmitted.

The embodiments of the present invention provide a data transmitting method, comprising:

a transmitting end coding and modulating a plurality of transport blocks of a same receiving end, wherein a same precoding matrix is used to precode the plurality of transport blocks.

the transmitting end mapping the plurality of transport blocks onto time-frequency resources of a plurality of subframes; and the transmitting end transmitting the plurality of subframes.

Alternatively, M transport blocks are crossly mapped onto time-frequency resources of N subframes by the transmitting end, and a part of data of K transport blocks are included in time-frequency resources of one subframe, the M, N, K are positive integers, all of which are greater than or equal to 2, and K is less than or equals to M.

Alternatively, data mapped onto same time-frequency resource granularity are data of a same transport block, and the time-frequency resource granularity is a resource element (RE), a symbol, or a sub-carrier.

Alternatively, the transmitting end configures different modulation and coding schemes (MCS) for the plurality of transport blocks.

Alternatively, the time-frequency resources onto which the plurality of transport blocks are mapped are time-frequency resources not occupied by a control channel and a pilot, and can be used for user data transmission.

Alternatively, resource mapping rules for the different subframes can be same or different.

Alternatively, the resource mapping rules are predefined by the transmitting end, or notified to the receiving end by the transmitting end through a high-layer signaling or a physical-layer signaling.

The embodiment of the present invention further provides a data receiving method, comprising:

a receiving end receiving a plurality of subframes transmitted by a transmitting end;

the receiving end determining time-frequency resources onto which a plurality of transport blocks are mapped in the plurality of subframes; and the receiving end jointly demodulating a plurality of transport blocks in the time-frequency resources.

Alternatively, the receiving end jointly demodulates the plurality of transport blocks by adopting an iteration algorithm and utilizing obtained channel frequency domain response.

Alternatively, the receiving end jointly demodulates a plurality of transport blocks in the time-frequency resources, comprising:

demodulating a first transport block, demodulating data of a first transport block in M transport block as a predetermined demodulation order according to channel frequency domain response of a pilot signal.

calculating a channel frequency domain response, coding and modulating demodulated data of a current transport block, obtaining a channel frequency domain response corresponding to the data in the transport block by channel estimation;

demodulating subsequent transport blocks, demodulating data of a next transport block by using the obtained channel frequency domain response; and calculating the channel frequency domain response and demodulating the subsequent transport blocks repeatedly until all transport blocks have been demodulated.

Alternatively, the receiving end in turn demodulates a plurality of transport blocks in the time-frequency resources as a predetermined demodulation order.

Alternatively, the predetermined demodulation order is an order of modulation and coding schemes (MCS) from low to high, an order predefined by the transmitting end and the receiving end or an order notified by the transmitting end through a signaling.

Alternatively, the obtained channel frequency domain response includes channel frequency domain responses of all demodulated transport blocks and a channel frequency domain response of resources where a pilot is located, which is obtained by channel estimation.

Alternatively, the pilot signal is a cell specific reference signal (CRS) or a demodulation reference signal (DMRS).

Alternatively, the calculating the channel frequency domain response comprises: the receiving end adopting a same precoding matrix and a same MCS with the transmitting end to perform coding and modulating.

The embodiment of the present invention further provides a data transmitting end, comprises:

a coding and modulation unit, configured to code and modulate a plurality of transport blocks of a same receiving end, wherein a same precoding matrix is used to precode the plurality of transport blocks.

a resource mapping unit, configured to map the plurality of transport blocks onto time-frequency resources of a plurality of subframes; and a transmitting unit, configured to transmit the plurality of subframes.

The embodiment of the present invention further provides a data receiving end, comprising:

a receiving unit, configured to receive a plurality of subframes transmitted by a transmitting end;

a resource determining unit, configured to determine time-frequency resources onto which a plurality of transport blocks are mapped in a plurality of subframes.

a demodulation unit, configured to jointly demodulate a plurality of transport blocks in the time-frequency resources.

In the data transmitting and receiving method provided by the embodiments of the present invention, the transmitting end uses the same precoding matrix to precode the plurality of transport blocks, which improves the efficiency of the coding and modulation, and improves the system performance of the transmitting end. Meanwhile, the receiving end jointly demodulates the plurality of transport blocks received to improve the system performance, which fully utilizes the performance advantage taking by coding and modulating the plurality of transport blocks simultaneously and demodulating the plurality of transport blocks simultaneously to improve the system performance.

PREFERRED EMBODIMENTS OF THE INVENTION

The technical scheme described in the embodiments of the present invention will be described in details in combination with the accompanying drawings and specific embodiments below, so that the skilled in the art can better understand the embodiments of the present invention and implement the embodiments of the present invention, but the illustrated embodiments are not a limitation to the patent document. It should be noted that the embodiments and features in the embodiments of the present application may be combined with one another without conflict.

Figure 1:
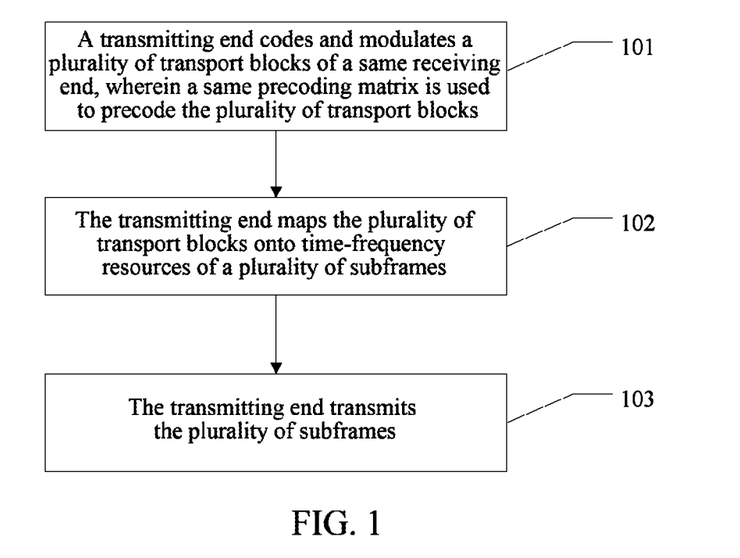
FIG. 1 is a schematic diagram of an embodiment of a data transmitting method according to the embodiment of the present invention.

In the related technique, when transmitting a plurality of transport blocks, the transmitting end uses different precoding to perform coding and modulating for the different transport blocks, correspondingly the receiving end can only demodulate the plurality of received transport blocks independently, which causes the reduced system performance. The data transmitting method in the embodiments of the present invention, as shown in FIG. 1, the transmitting end uses the same precoding matrix to precode the plurality of transport blocks, which better solves this problem, preferably, the method comprises that:

In step 101, a transmitting end codes and modulates a plurality of transport blocks of a same receiving end, wherein a same precoding matrix is used to precode the plurality of transport blocks;

For the LTE system, in dynamic scheduling, one DCI can trigger the UE only to receive one PDSCH or transmit one PUSCH, while actually for the user with low speed moving, when the user has continuous data to be transmitted, the continuous data can be transmitted in a plurality of subframes by using same scheduling parameters, at this point the control overhead of the dynamic transmission is relatively large, which reduces the system performance; while in SPS scheduling, since the maximum MCS limit is 15, it is unable to use a high-order modulation or support the user transmission of which the amount of data is relatively large.

However, in order to provide a higher frequency spectrum efficiency for the user, it is necessary to reduce the control overhead of the base station scheduling. Therefore, the concept of multi-subframe scheduling is proposed, that is, the base station can schedule a plurality of uplink subframes or downlink subframes through one DCI, the UE can receive downlink data in the plurality of scheduled downlink subframes or transmit uplink data in the plurality of scheduled uplink subframes. However, the shortcoming of the related multi-subframe scheduling is that the scheduling parameters of the plurality of scheduled subframes (e.g. MCS, etc.) can only remain consistent and cannot be adjusted according to the changes of the channel environments, which reduces the flexibility of the scheduling and limits the improvement of the system performance.

Alternatively, the transmitting end of the embodiments of the present configures different modulation and coding schemes (MCS) for the plurality of transport blocks. Preferably, the scheduling parameters of the plurality of scheduled subframes (e.g. MCS) can be adjusted according to the changes of the channel environments, which improves the flexibility of the scheduling and system performance.

In step 102, the transmitting end maps the plurality of transport blocks onto time-frequency resources of a plurality of subframes;

Alternatively, M transport blocks are crossly mapped onto time-frequency resources of N subframes by the transmitting end, and M and N are positive integers, both of which are greater than or equal to 2.

Understandably, M and N may be same or may be different.

After the transport blocks are crossly mapped by the transmitting end, time-frequency resources in one subframe include a part of data of K transport blocks. Here, K is a positive integer and K is greater than or equal to 2, and K is less than or equal to the above M.

The data mapped onto same time-frequency resource granularity are data of a same transport block, the time-frequency resource granularity is a resource element (RE), a symbol, or a subcarrier.

Crossing mapping is performed according to the RE referred to as the granularity, that is, the data mapped onto a same RE are the data of the same transport block, and the data of the plurality of scheduled transport blocks are crossly mapped onto available RE resources of scheduled subframes.

The above available RE resources refer to REs in the subframe which are not occupied by the control channel and the pilots and can be used for user data transmission.

The crossing mapping is performed according to the symbol referred to as the granularity, that is, the data mapped onto a same symbol are the data of the same transport block, and the data of the plurality of scheduled transport blocks are crossly mapped onto available symbols of scheduled subframes.

The above available symbols refer to symbols in the subframe which are not occupied by the control channel and can be used for user data transmission.

When the transmitting end is a base station, the above symbols are OFDM symbols, when the transmitting end is a user equipment, the above symbols are SC-FDMA symbols.

The crossing mapping is performed according to the subcarrier referred to as the granularity, that is, the data mapped onto a same subcarrier or several subcarriers are the data of the same transport block, and the data of the plurality of scheduled transport blocks are crossly mapped onto available subcarriers of scheduled subframes.

The above available subcarriers refer to subcarriers in the subframe which are not occupied by the control channel and the pilots and can be used for user data transmission.

The resource mapping rules for the different subframes can be same or different, that is, the transmitting end independently performs the crossing scheduling on the plurality of scheduled subframes. For example, in the first subframe, mapping may be performed in odd-numbered symbols, and in the second subframe, mapping may be performed in even-numbered symbols.

The time-frequency resources onto which the plurality of transport blocks are mapped are time-frequency resources not occupied by a control channel and a pilot, and can be used for user data transmission.

The mapping rules are predefined by the transmitting end, or notified to the receiving end by the transmitting end through a high-layer signaling or a physical-layer signaling.

In step 103, the transmitting end transmits the plurality of subframes.

The data transmitting method in the embodiments of the present invention is not only applicable to the multi-subframe scheduling and also the single-subframe scheduling.

In the embodiments of the present invention, the transmitting end uses the same precoding matrix to precode the plurality of the transport blocks, which improves the efficiency of the coding and modulation, and improves the system performance of the transmitting end. Meanwhile, the receiving end jointly demodulates the plurality of transport blocks received to improve the system performance, and the data receiving method of the embodiments of the present invention will be illustrated below from the perspective of the receiving end.

Figure 2:
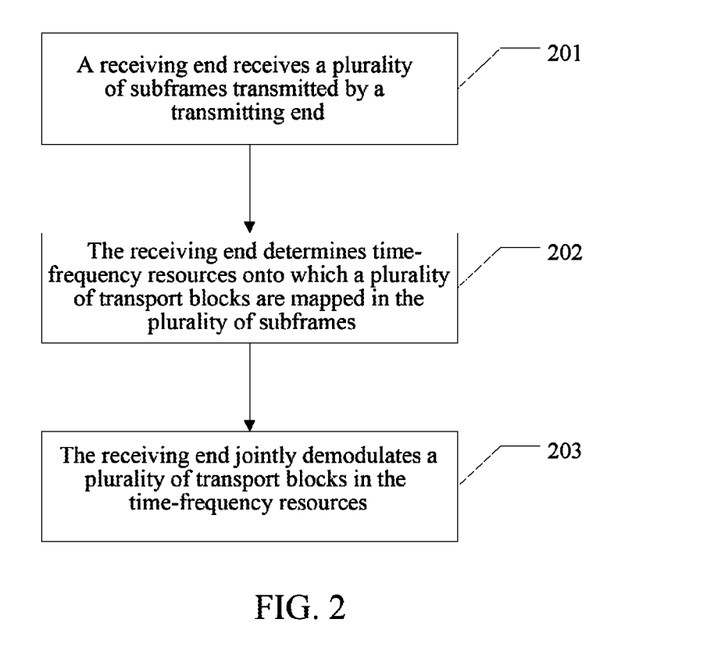
FIG. 2 is a schematic diagram of an embodiment of a data receiving method according to the embodiment of the present invention.

Corresponding to the above data transmitting method, the embodiment of the present invention further provides a data receiving method, as shown in FIG. 2, which comprises that:

In step 201, a receiving end receives a plurality of subframes transmitted by a transmitting end;

In step 202, the receiving end determines time-frequency resources onto which a plurality of transport blocks are mapped in the plurality of subframes; and In step 203, the receiving end jointly demodulates a plurality of transport blocks in the time-frequency resources.

Understandably, since the transmitting end uses the same precoding matrix to precode the plurality of transport blocks, so that the receiving end can jointly demodulate the plurality of transport blocks.

Preferably, the receiving end adopts a joint demodulation algorithm including but not limited to a iteration algorithm, which utilizes the obtained channel frequency domain response to jointly demodulate the plurality of transport blocks.

Alternatively, the receiving end in turn demodulates the plurality of transport blocks in the time-frequency resources as a predetermined demodulation order.

Figure 3:
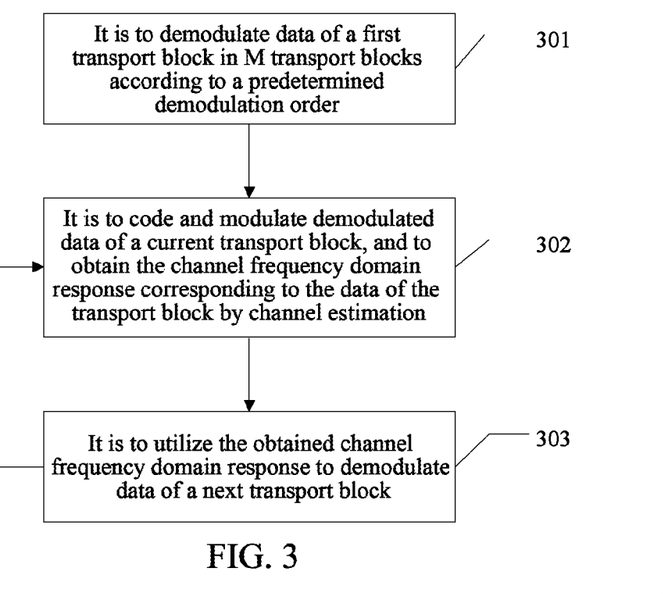
FIG. 3 is a schematic diagram of flow of demodulating a transport block in FIG. 2.

Alternatively, as shown in FIG. 3, the step 203 of the receiving end jointly demodulating a plurality of transport blocks in the time-frequency resources comprises that:

In step 301, the step of demodulating a first transport block, it is to demodulate data of a first (i.e. first) transport block in M transport blocks as a predetermined demodulation order according to the channel frequency domain response of a pilot signal;

In step 302, the step of calculating the channel frequency domain response, it is to code and modulate the demodulated data of a current transport block, and to obtain the channel frequency domain response corresponding to the data of the transport block by channel estimation;

In step 303, the step of demodulating subsequent transport blocks, it is to utilize the obtained channel frequency domain response to demodulate data of a next transport block; and it is to repeat the step of calculating the channel frequency domain response and the step of demodulating subsequent transport blocks until all the transport blocks have been demodulated.

Preferably, the predetermined demodulation order is an order of modulation and coding schemes (MCS) form low to high, an order defined by the transmitting end and the receiving end or an order notified by the transmitting end through a signaling.

The demodulation is performed as the order of the modulation and coding schemes (MCS) form low to high, that is, data of a transport block of which the MCS is lowest are firstly demodulated, and then data of a transport block of which the MCS is second lowest are demodulated, and the like, until all the data of the M transport blocks have been demodulated; an order of demodulating the data of the plurality of transport blocks with the same MCS is determined by the receiving end itself.

In the step of calculating the channel frequency domain response, the receiving end adopts the same precoding matrix and the same MCS with the transmitting end to perform coding and modulating.

The above receiving end may be a base station and may also be a user equipment.

Alternatively, the above described obtained channel frequency domain response includes the channel frequency domain response of all demodulated transport blocks and the channel frequency domain response of resources where the pilot is located, which is obtained by channel estimation.

Preferably, the pilot can be a cell specific reference signal (CRS) or a demodulation reference signal (DMRS).

The data receiving method in the embodiments of the present invention is not only applicable to the multi-subframe scheduling, but also the single-subframe scheduling.

The implementation details of multi-subframe data transmitting method in the embodiments of the present invention will be described in details below by referring to accompanying drawings and in combination with the specific application example.

Application Example 1

Figure 4:
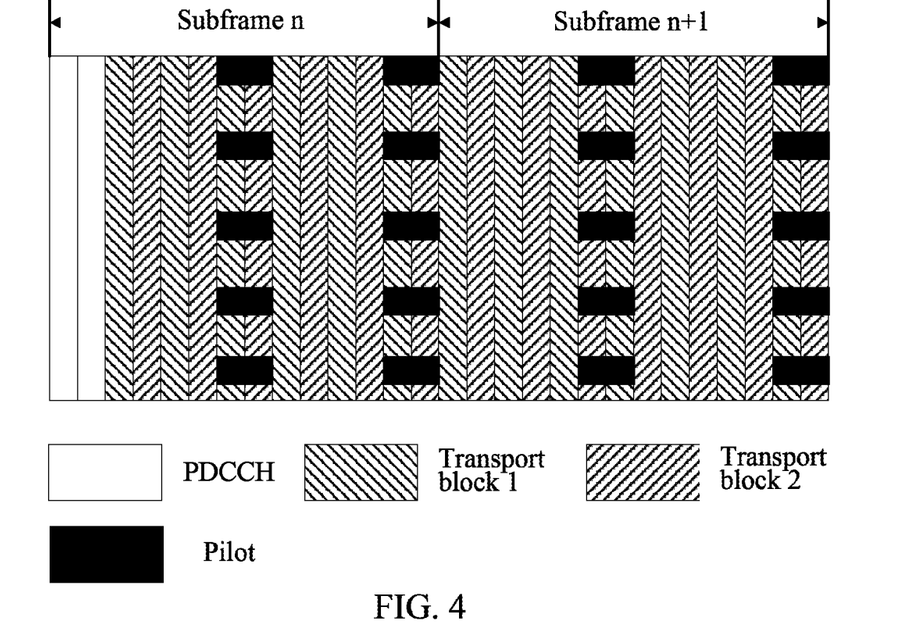
FIG. 4 is a schematic diagram of subframe resources of a multi-subframe data transmitting method in application example 1.

As shown in FIG. 4, assuming that a PDCCH transmitted by a base station occupies 2 OFDM symbols, the base station transmits two transport blocks which are transport block 1 and transport block 2 respectively to a UE in the downlink subframe n and downlink subframe n+1 through the multi-subframe scheduling, wherein the MCS of the transport block 1 is 8, and the MCS of the transport block 2 is 10, assuming that the way of crossing mapping used by the base station is that the crossing mapping is performed according to an OFDM symbol referred to as granularity, after coding and modulating the transport block 1 and transport block 2, the base station crossly maps data of the transport block 1 and transport block 2 to all OFDM symbols of the subframe n and subframe n+1.

Wherein except the first symbol and the second symbol of the subframe n, all symbols can be used for the mapping of the transport blocks, all symbols of the subframe n+1 can be used for the mapping of the transport blocks.

Assuming that the base station maps the data of the transport block 1 onto odd-numbered symbols of the subframe n and subframe n+1; and maps the data of the transport block 2 onto even-numbered symbols of the subframe n and subframe n+1.

Then the base station maps the data of the transport block 1 onto the 3rd symbol, the 5th symbol, the 7th symbol, the 9th symbol, the 11th symbol and the 13 symbol of the subframe n; and onto the 1st symbol, the 3rd symbol, the 5th symbol, the 7th symbol, the 9th symbol, the 11th symbol and the 13 symbol of the subframe n+1.

The base station maps the data of the transport block 2 onto the 4th symbol, the 6th symbol, the 8th symbol, the 10th symbol, the 12th symbol and the 14 symbol of the subframe n; and onto the 2nd symbol, the 4th symbol, the 6th symbol, the 8th symbol, the 10th symbol, the 12th symbol and the 14 symbol of the subframe n+1.

After the crossing mapping is finished, the base station transmits the subframe n and subframe n+1.

Assuming that the base station notifies the UE of the crossing mapping method in an agreed manner, and the UE demodulates the received subframe n and the received subframe n+1 according to the order of the MCSs from low to high.

Then the UE demodulates the received subframe n and the received subframe n+1 according to following steps.

It is to demodulate the data of the transport block 1 firstly.

After the data of the transport block 1 have been demodulated, the UE uses the MCS and the precoding matrix which are same with those of the base station during transmission to code and modulate the demodulated data of the transport block 1 again and obtains the channel frequency domain response corresponding to the data of the transport block 1 by the channel estimation.

It is to demodulate the data of the transport block 2 using the obtained channel frequency domain response of the transport block 1 and the channel frequency domain response corresponding to the pilot obtained by the pilot.

After the data of the transport block 2 have been demodulated, it is to determine that the demodulation of all the transport blocks have been finished, at this point, the demodulation of all the data has been finished.

Application Example 2

Figure 5:
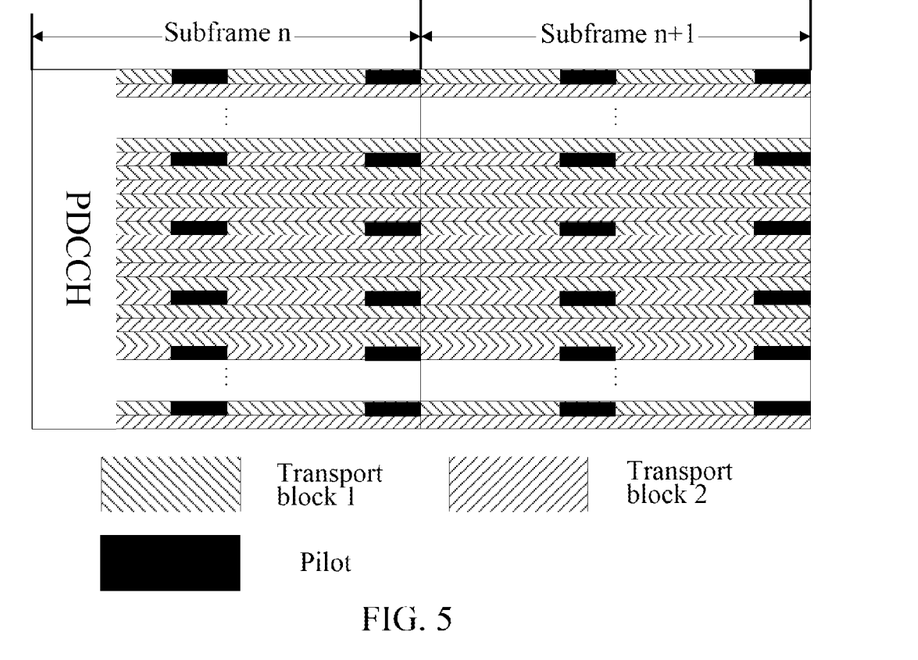
FIG. 5 is a schematic diagram of subframe resources of a multi-subframe data transmitting method in application example 2.

As shown in FIG. 5, assuming that a PDCCH transmitted by a base station occupies 3 OFDM symbols, the base station transmits two transport blocks which are transport block 1 and transport block 2 respectively to a UE in the downlink subframe n and downlink subframe n+1 through multi-subframe scheduling, wherein the MCS of the transport block 1 is 8, and the MCS of the transport block 2 is 9, assuming that the way of crossing mapping used by the base station is that the crossing mapping is performed according to a subcarrier referred to as granularity, after coding and modulating the transport block 1 and transport block 2, the base station crossly maps data of the transport block 1 and transport block 2 to all subcarriers of the subframe n and subframe n+1.

Wherein all subcarriers of the subframe n can be used for the mapping of the transport blocks, all subcarriers of the subframe n+1 can be used for the mapping of the transport blocks. Assuming that the base station maps the data of the transport block 1 onto odd-numbered subcarriers of the subframe n and subframe n+1; and maps the data of the transport block 2 onto even-numbered subcarriers of the subframe n and subframe n+1.

Assuming that the subframe n and subframe n+1 both have p subcarriers, p is an even number and p is a positive integer.

Then the base station maps the data of the transport block 1 onto the 1st subcarrier, the 3rd subcarrier, the 5th subcarrier, the 7th subcarrier . . . the p−3th subcarrier, and the p−1th subcarrier of the subframe n; and onto the 1st subcarrier, the 3rd subcarrier, the 5th subcarrier, the 7th subcarrier . . . the p−3th subcarrier, and the p−1th subcarrier of the subframe n+1.

The base station maps the data of the transport block 2 onto the 2nd subcarrier, the 4th subcarrier, the 6th subcarrier, the 8th subcarrier . . . the p−2th subcarrier, and the pth subcarrier of the subframe n; and onto 2nd subcarrier, the 4th subcarrier, the 6th subcarrier, the 8th subcarrier . . . the p−2th subcarrier, and the pth subcarrier of the subframe n+1.

After the crossing mapping is finished, the base station transmits the subframe n and subframe n+1.

The step of the demodulation for the user equipment refers to the application example 1.

Application Example 3

Figure 6:
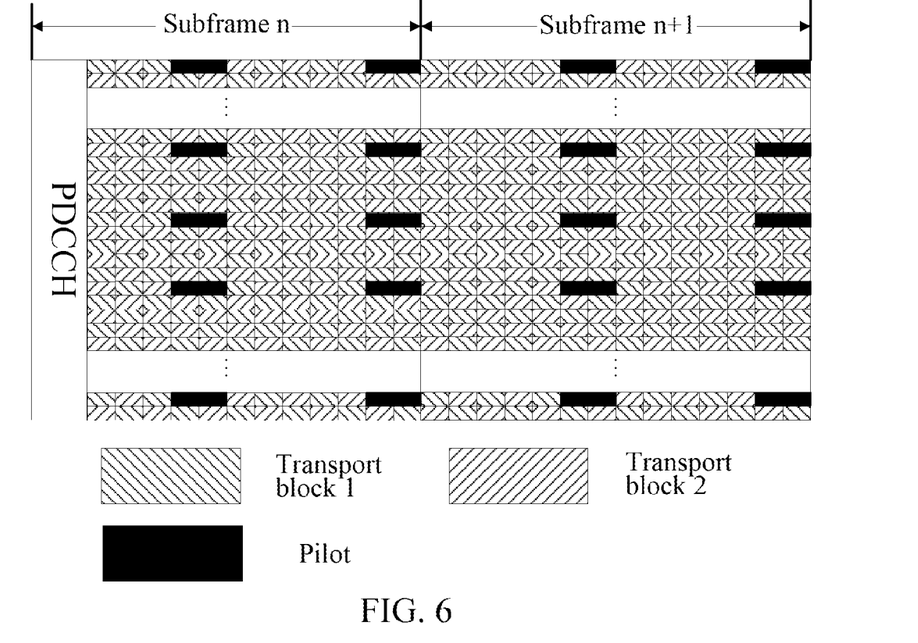
FIG. 6 is a schematic diagram of subframe resources of a multi-subframe data transmitting method in application example 3.

As shown in FIG. 6, assuming that a PDCCH transmitted by a base station occupies 2 OFDM symbols, the base station transmits two transport blocks which are transport block 1 and transport block 2 respectively to a UE in the downlink subframe n and downlink subframe n+1 through multi-subframe scheduling, wherein the MCS of the transport block 1 is 8, and the MCS of the transport block 2 is 10, assuming that the way of crossing mapping used by the base station is that the crossing mapping is performed according to an RE referred to as the granularity, after coding and modulating the transport block 1 and transport block 2, the base station crossly maps data of the transport block 1 and transport block 2 to all REs of the subframe n and subframe n+1.

Assuming that the base station maps the data of the transport block 1 onto odd-numbered subcarriers of odd-numbered symbols and even-numbered subcarriers of even-numbered symbols of the subframe n and subframe n+1; and maps the data of the transport block 2 onto even-numbered subcarriers of odd-numbered symbols and odd-numbered subcarriers of even-numbered symbols of the subframe n and subframe n+1.

Assuming that the subframe n and subframe n+1 both have p subcarriers, p is an even number and p is a positive integer.

Then the base station maps the data of the transport block 1 onto the 1st RE, the 3rd RE . . . the p−1th RE of the 1st symbol, the 3rd symbol . . . the 13th symbol of the subframe n and subframe n+1, the 2nd RE, the 4th RE . . . the pth RE of the 2nd symbol, the 4th RE symbol . . . the 14th symbol of the subframe n and subframe n+1.

Then the base station maps the data of the transport block 2 onto the 2nd RE, the 4th RE . . . the pth RE of the 1st symbol, the 3rd symbol . . . the 13th symbol of the subframe n and subframe n+1; and onto the 1st RE, the 3rd RE . . . the p−1th RE of the 2nd symbol, the 4th RE symbol . . . the 14th symbol of the subframe n and subframe n+1.

After the crossing mapping is finished, the base station transmits the subframe n and subframe n+1.

The step of the demodulation for the user equipment refers to the application example 1.

Application Example 4

Figure 7:
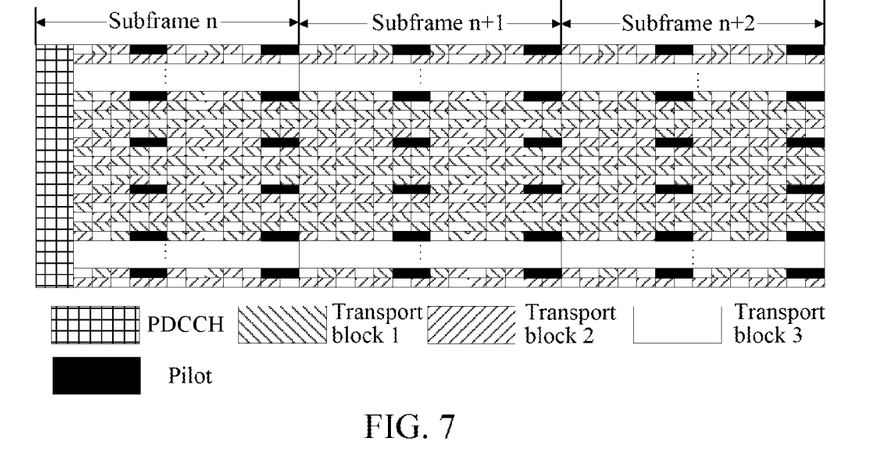
FIG. 7 is a schematic diagram of subframe resources of a multi-subframe data transmitting method in application example 4.

As shown in FIG. 7, assuming that a PDCCH transmitted by a base station occupies 3 OFDM symbols, the base station transmits three transport blocks which are transport block 1, transport block 2 and transport block 3 respectively to a UE in the downlink subframe n, downlink subframe n+1 and downlink subframe n+2 through multi-subframe scheduling, wherein the MCS of the transport block 1 is 8, the MCS of the transport block 2 is 11 and MCS of the transport block 3 is 12, assuming that the way of crossing mapping used by the base station is that the crossing mapping is performed according to an RE referred to as the granularity, after coding and modulating the transport block 1, transport block 2 and transport block 3, the base station crossly maps data of the transport block 1, transport block 2 and transport block 3 to all REs of the subframe n and subframe n+1 and subframe n+2.

Since the first 3 symbols are occupied by the PDCCH, the base station in turn maps data of the 3 transport blocks to all available REs according to the principle of first time domain and then frequency domain, and specifically starting from the 4th symbol of subframe n, the base station in turn maps the data of 3 transport blocks onto available REs according to an order of the transport block 1, transport block 2 and transport block 3 and an order from high frequency to low frequency; in the 5th symbol, the base station in turn maps the data of the 3 transport blocks onto the available REs according to the order of the transport block 2, transport block 3 and transport block 1 and order from high frequency to low frequency; in the 6th symbol, the base station in turn maps the data of the 3 transport blocks onto the available REs according to the order of the transport block 3, transport block 1 and transport block 2 and order from high frequency to low frequency; and the like. After the crossing mapping is finished, the base station transmits the subframe n, subframe n+1 and subframe n+2.

Assuming that the base station notifies the UE of the crossing mapping method in an agreed manner, and the UE demodulates the received subframe n and the received subframe n+1 according to the order of the MCSs from low to high. Then the UE demodulates the received subframe n and the received subframe n+1 according to following steps.

It is to demodulate the data of the transport block 1 firstly.

After the data of the transport block 1 have been demodulated, the UE uses the MCS and the precoding matrix which are same with those of the base station during transmission to code and modulate the demodulated data of the transport block 1 again and obtains the channel frequency domain response corresponding to the data of the transport block 1 by the channel estimation.

It is to demodulate the data of the transport block 2 using the obtained channel frequency domain response of the transport block 1 and the channel frequency domain response corresponding to the pilot obtained by the pilot.

After the data of the transport block 2 have been demodulated, the UE uses the MCS and the precoding matrix which are same with those of the base station during transmission to code and modulate the demodulated data of the transport block 2 again and obtains the channel frequency domain response corresponding to the data of the transport block 2 by the channel estimation.

It is to demodulate the data of the transport block 3 using the obtained channel frequency domain response of the transport block 1 and transport block 2 and the channel frequency domain response corresponding to the pilot obtained by the pilot.

After the data of the transport block 2 have been demodulated, it is to determine that the demodulation of all the transport blocks have been finished, at this point, the demodulation of all the data has been finished.

Application Example 5

Figure 8:
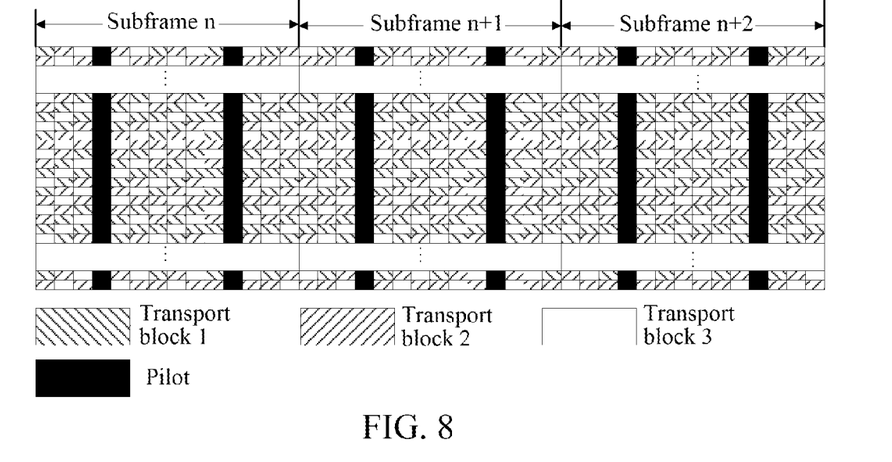
FIG. 8 is a schematic diagram of subframe resources of a multi-subframe data transmitting method in application example 5.

As shown in FIG. 8, the base station schedules a UE to transmit three transport blocks which are transport block 1, transport block 2 and transport block 3 respectively to the base station in the uplink subframe n, uplink subframe n+1 and uplink subframe n+2 through the multi-subframe scheduling, wherein the MCS of the transport block 1 is 8, the MCS of the transport block 2 is 10 and the MCS of the transport block 3 is 12. Assuming that the base station notifies the UE through performing notifying by means of high-layer signaling to use the way of the crossing mapping to perform the crossing mapping according to an RE referred to as the granularity, after coding and modulating the transport block 1, transport block 2 and transport block 3, the UE crossly maps the data of the transport block 1, transport block 2 and transport block 3 to all REs of the subframe n, subframe n+1 and subframe n+2.

The UE in turn maps data of the 3 transport blocks to all available REs according to the principle of first time domain and then frequency domain, and specifically starting from the 4th symbol of subframe n, the UE in turn maps the data of 3 transports blocks to available REs according to an order of the transport block 1, transport block 2 and transport block 3 and order from high frequency to low frequency; in the 5th symbol, the UE in turn maps the data of the 3 transport blocks to the available REs according to the order of the transport block 2, transport block 3 and transport block 1 and order from high frequency to low frequency; in the tithe symbol, the UE in turn maps the data of the 3 transport blocks to the available REs according to the order of the transport block 3, transport block 1 and transport block 2 and order from high frequency to low frequency; and the like.

After the crossing mapping is finished, the UE transmits the subframe n, subframe n+1 and subframe n+2.

The step of the demodulation for the base station refers to the application example 4.

Application Example 6

The base station transmits two transport blocks which are transport block 1 and transport block 2 respectively to a UE in the downlink subframe n and downlink subframe n+1 through multi-subframe scheduling, wherein the MCS of the transport block 1 is 5, and the MCS of the transport block 2 is 8, assuming that the way of crossing mapping used by the base station is that the crossing mapping is performed according to an RE referred to as granularity, after coding and modulating the transport block 1 and transport block 2, the base station crossly maps data of the transport block 1 and transport block 2 to all REs of the subframe n and subframe n+1.

Assuming that the base station maps the data of the transport block 1 onto odd-numbered subcarriers of odd-numbered symbols and even-numbered subcarriers of even-numbered symbols of the subframe n and subframe n+1; and maps the data of the transport block 2 onto even-numbered subcarriers of odd-numbered symbols and odd-numbered subcarriers of even-numbered symbols of the subframe n and subframe n+1.

Assuming that the subframe n and subframe n+1 both have p subcarriers, p is an even number and p is a positive integer.

Then the base station maps the data of the transport block 1 onto the 1st RE, the 3rd RE . . . the p−1th RE of the 1st symbol, the 3rd symbol . . . the 13th symbol of the subframe n and subframe n+1, the 2nd RE, the 4th RE . . . the pth RE of the 2nd symbol, the 4th RE symbol . . . the 14th symbol of the subframe n and subframe n+1.

Then the base station maps the data of the transport block 2 onto the 2nd RE, the 4th RE . . . the pth RE of the 1st symbol, the 3rd symbol . . . the 13th symbol of the subframe n and subframe n+1; and onto the 1st RE, the 3rd RE . . . the p−1th RE of the 2nd symbol, the 4th RE symbol . . . the 14th symbol of the subframe n and subframe n+1.

After the crossing mapping is finished, the base station transmits the subframe n and subframe n+1.

Assuming that the base station notifies the UE of the crossing mapping method through a high-layer signaling, and it notifies the UE to demodulate the received subframe n and the received subframe n+1 according to the order of the MCSs from low to high through the high-layer signaling. Then the UE demodulates the received subframe n and the received subframe n+1 according to following steps.

It is to demodulate the data of the transport block 1 firstly.

After the data of the transport block 1 have been demodulated, the UE uses the MCS and the precoding matrix which are same with those of the base station during transmission to code and modulate the demodulated data of the transport block 1 again and obtains the channel frequency domain response corresponding to the data of the transport block 1 by the channel estimation.

It is to demodulate the data of the transport block 2 using the obtained channel frequency domain response of the transport block 1 and the channel frequency domain response corresponding to the pilot obtained by the pilot.

After the data of the transport block 2 have been demodulated, it is to determine that the demodulation of all the transport blocks have been finished, at this point, the demodulation of all the data has been finished.

Application Example 7

The base station transmits two transport blocks which are transport block 1 and transport block 2 respectively to a UE in the downlink subframe n and downlink subframe n+1 through the multi-subframe scheduling, wherein the MCS of the transport block 1 is 8, and the MCS of the transport block 2 is 10, assuming that the way of crossing mapping used by the base station is that the crossing mapping is performed according to an RE referred to as granularity, after coding and modulating the transport block 1 and transport block 2, the base station crossly maps data of the transport block 1 and transport block 2 to all REs of the subframe n and subframe n+1.

Assuming that the subframe n and subframe n+1 both have p subcarriers, p is an even number and p is a positive integer.

Then the base station maps the data of the transport block 1 onto the 1st RE, the 3rd RE . . . the p−1th RE of the 1st symbol, the 3rd symbol . . . the 13th symbol of the subframe n and subframe n+1, the 2nd RE, the 4th RE . . . the pth RE of the 2nd symbol, the 4th RE symbol . . . the 14th symbol of the subframe n and subframe n+1.

Then the base station maps the data of the transport block 2 onto the 2nd RE, the 4th RE . . . the pth RE of the 1st symbol, the 3rd symbol . . . the 13th symbol of the subframe n and subframe n+1; and onto the 1st RE, the 3rd RE . . . the p−1th RE of the 2nd symbol, the 4th RE symbol . . . the 14th symbol of the subframe n and subframe n+1.

After the crossing mapping is finished, the base station transmits the subframe n and subframe n+1.

Assuming that the base station notifies the UE of the crossing mapping method through a physical-layer signaling, and notifies the UE to demodulate the received subframe n and the received subframe n+1 according to the order of the MCSs from low to high through the physical-layer signaling. Then the UE demodulates the received subframe n and the received subframe n+1 according to following steps.

It is to demodulate the data of the transport block 1 firstly.

After the data of the transport block 1 have been demodulated, the UE uses the MCS and the precoding matrix which are same with those of the base station during transmission to code and modulate the demodulated data of the transport block 1 again and obtains the channel frequency domain response corresponding to the data of the transport block 1 by the channel estimation.

It is to demodulate the data of the transport block 2 using the obtained channel frequency domain response of the transport block 1 and the channel frequency domain response corresponding to the pilot obtained by the pilot.

After the data of the transport block 2 have been demodulated, it is to determine that the demodulation of all the transport blocks have been finished, at this point, the demodulation of all the data has been finished.

Application Example 8

Figure 9:
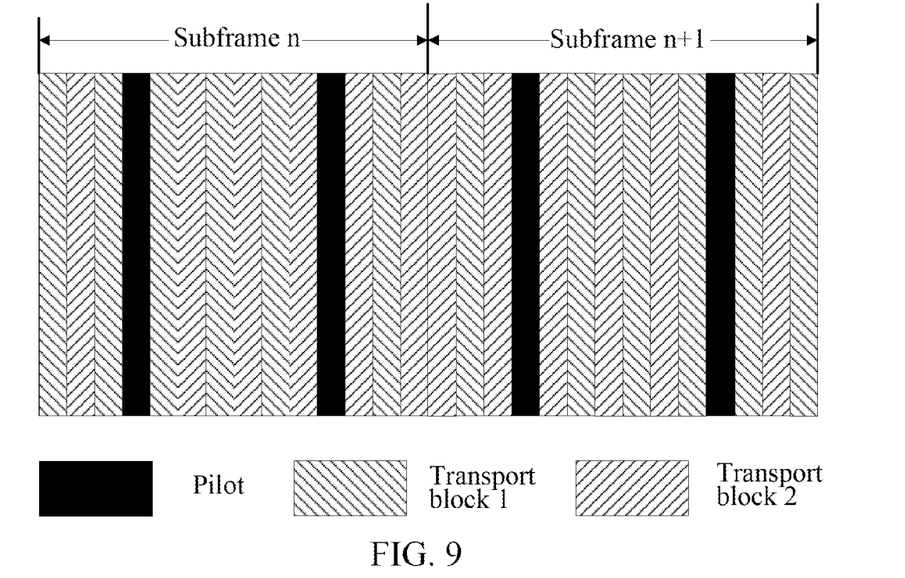
FIG. 9 is a schematic diagram of subframe resources of a multi-subframe data transmitting method in application example 8.

As shown in FIG. 9, the base station schedules a UE to transmit two transport blocks which are transport block 1 and transport block 2 respectively to the base station in the uplink subframe n and uplink subframe n+1 through the multi-subframe scheduling, wherein the MCS of the transport block 1 is 7, the MCS of the transport block 2 is 9, assuming that the way of the crossing mapping used by the base station is that the crossing mapping is performed according to a SC-FDMA symbol referred to as the granularity, assuming that the base station notifies the UE of the crossing mapping method in the agreed manner, after coding and modulating the transport block 1 and transport block 2, the UE crossly maps the data of the transport block 1 and transport block 2 to all SC-FDMA symbols of the subframe n and subframe n+1.

Wherein the 4th symbol and the 11th symbol of the subframe n and subframe n+1 are used to transmit uplink pilots.

The UE maps the data of the transport block 1 onto odd-numbered symbols of the subframe n and even-numbered symbols of the subframe n+1; and maps the data of the transport block 2 onto even-numbered symbols of the subframe n and odd-numbered symbols of the subframe n+1.

The UE maps the data of the transport block 1 onto the 1st symbol, the 3rd symbol, the 5th symbol, the 7th symbol, the 9th symbol, and the 13 symbol of the subframe n; and onto the 2nd symbol, the 6th symbol, the 8th symbol, the 10th symbol, the 12th symbol and the 14 symbol of the subframe n+1.

The base station maps the data of the transport block 2 onto the 2nd symbol, the 6th symbol, the 8th symbol, the 10th symbol, the 12th symbol and the 14 symbol of the subframe n; and onto the 1st symbol, the 3rd symbol, the 5th symbol, the 7th symbol, the 9th symbol and the 13 symbol of the subframe n+1.

After the crossing mapping is finished, the base station transmits the subframe n and subframe n+1.

The base station demodulates the received subframe n and the received subframe n+1 according to following steps.

It is to demodulate the data of the transport block 1 firstly.

After the data of the transport block 1 have been demodulated, the UE uses the MCS and the precoding matrix which are same with those of the base station during transmission to code and modulate the demodulated data of the transport block 1 again and obtains the channel frequency domain response corresponding to the data of the transport block 1 by the channel estimation.

It is to demodulate the data of the transport block 2 using the obtained channel frequency domain response of the transport block 1 and the channel frequency domain response corresponding to the pilot obtained by the pilot.

After the data of the transport block 2 have been demodulated, it is to determine that the demodulation of all the transport blocks have been finished, at this point, the demodulation of all the data has been finished.

Application Example 9

Figure 10:
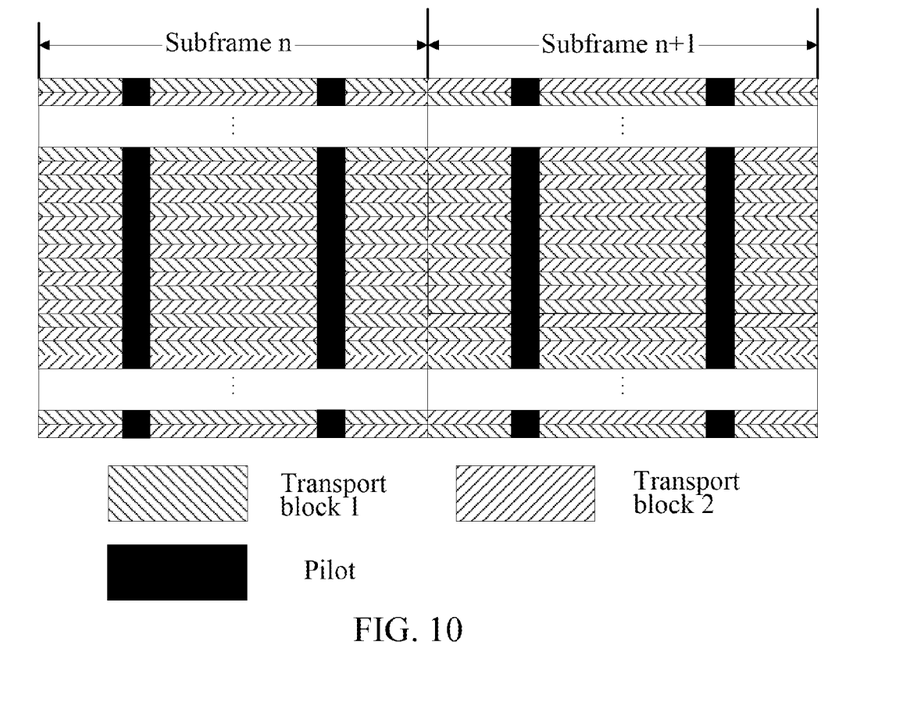
FIG. 10 is a schematic diagram of subframe resources of a multi-subframe data transmitting method in application example 9.

As shown in FIG. 10, the base station schedules a UE to transmit two transport blocks which are transport block 1 and transport block 2 respectively to the base station in the uplink subframe n and uplink subframe n+1 through the multi-subframe scheduling, wherein the MCS of the transport block 1 is 8, the MCS of the transport block 2 is 9, assuming that the way of the crossing mapping used by the base station is that the crossing mapping is performed according to a subcarrier referred to as the granularity, wherein the 4th symbol and the 11th symbol of the subframe n and subframe n+1 are used to transmit the uplink pilots.

Assuming that the base station notifies the UE of the crossing mapping method by means of the high-layer signaling notification, it is assumed that the UE maps the data of the transport block 1 onto odd-numbered subcarriers of the subframe n and even-numbered subcarriers of the subframe n+1; and maps the data of the transport block 2 onto even-numbered subcarriers of the subframe n and even-numbered subcarriers of the subframe n+1.

Assuming that the subframe n and subframe n+1 both have p subcarriers, p is an even number and p is a positive integer.

Then the UE maps the data of the transport block 1 onto the 1st subcarrier, the 3rd subcarrier, the 5th subcarrier, the 7th subcarrier . . . the p−3th subcarrier, and the p−1th subcarrier of the subframe n; and the 2nd subcarrier, the 4th subcarrier, the 6th subcarrier, the 8th subcarrier . . . the p−2th subcarrier, and the pth subcarrier of the subframe n+1.

The UE maps the data of the transport block 2 onto the 2nd subcarrier, the 4th subcarrier, the 6th subcarrier, the 8th subcarrier . . . the p−2th subcarrier, and the pth subcarrier of the subframe n; and 1st subcarrier, the 3rd subcarrier, the 5th subcarrier, the 7th subcarrier . . . the p−3th subcarrier, and the p−1th subcarrier of the subframe n+1.

The step of the demodulation for the base station refers to the application example 8.

Application Example 10

Figure 11:
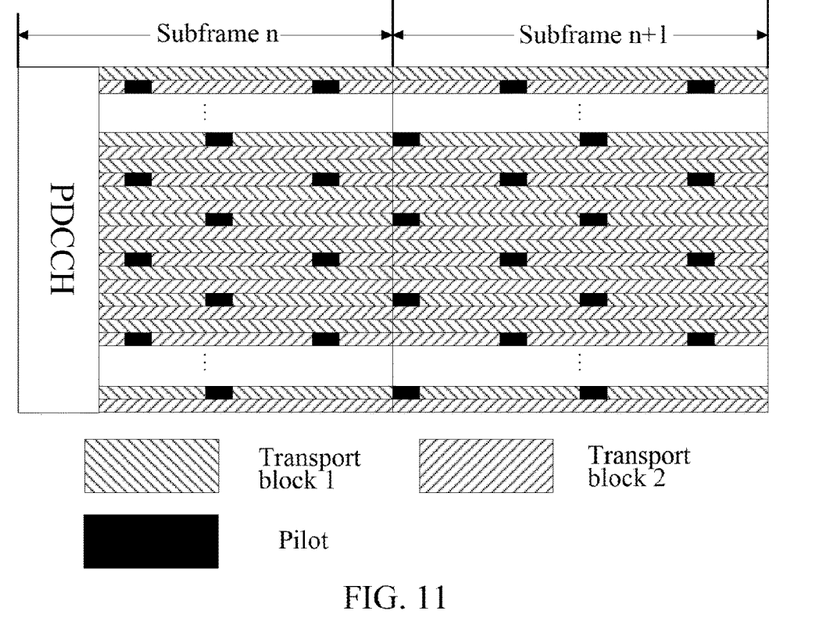
FIG. 11 is a schematic diagram of subframe resources of a multi-subframe data transmitting method in application example 10.

As shown in FIG. 11, assuming that a PDCCH transmitted by a base station occupies 3 OFDM symbols, the base station transmits two transport blocks which are transport block 1 and transport block 2 respectively to a UE in the downlink subframe n and downlink subframe n+1 through the multi-subframe scheduling, wherein the MCS of the transport block 1 is 8, and the MCS of the transport block 2 is 9, assuming that the way of crossing mapping used by the base station is that the crossing mapping is performed according to a subcarrier referred to as the granularity, after coding and modulating the transport block 1 and transport block 2, the base station crossly maps data of the transport block 1 and transport block 2 to all subcarriers of the subframe n and subframe n+1.

Assuming that, at this point the UE uses the CRS to perform the demodulation, except the resources occupied by the CRS and PDCCH, the remaining resources are all used for the user data transmission.

Wherein all subcarriers of the subframe n can be used for the mapping of the transport blocks, all subcarriers of the subframe n+1 can be used for the mapping of the transport blocks. Assuming that the base station maps the data of the transport block 1 onto odd-numbered subcarriers of the subframe n and subframe n+1; and maps the data of the transport block 2 onto even-numbered subcarriers of the subframe n and subframe n+1.

Assuming that the subframe n and subframe n+1 both have p subcarriers, p is an even number and p is a positive integer.

Then the base station maps the data of the transport block 1 onto the 1st subcarrier, the 3rd subcarrier, the 5th subcarrier, the 7th subcarrier . . . the p−3th subcarrier, and the p−1th subcarrier of the subframe n; and onto the 1st subcarrier, the 3rd subcarrier, the 5th subcarrier, the 7th subcarrier . . . the p−3th subcarrier, and the p−1th subcarrier of the subframe n+1.

The base station maps the data of the transport block 2 onto the 2nd subcarrier, the 4th subcarrier, the 6th subcarrier, the 8th subcarrier . . . the p−2th subcarrier, and the pth subcarrier of the subframe n; and onto 2nd subcarrier, the 4th subcarrier, the 6th subcarrier, the 8th subcarrier . . . the p−2th subcarrier, and the pth subcarrier of the subframe n+1.

After the crossing mapping is finished, the base station transmits the subframe n and subframe n+1.

The step of the demodulation for the user equipment refers to the application example 1.

Figure 12:
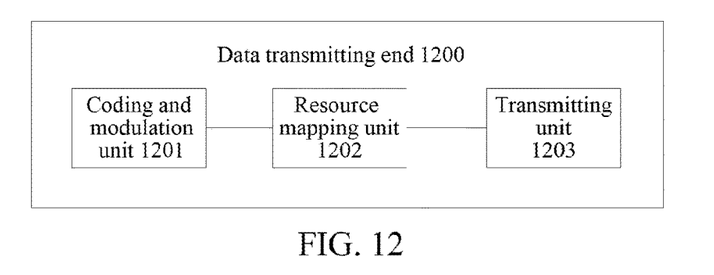
FIG. 12 is a structural schematic diagram of modules of a data transmitting end according to the embodiment of the present invention.

In order to realize the above data transmitting method in the embodiment, the embodiment of the present invention further provides a data transmitting end 1200, as shown in FIG. 12, the transmitting end comprises:

a coding and modulation unit 1201, which is configured to code and modulate a plurality of transport blocks of a same receiving end, wherein a same precoding matrix is used to precode the plurality of transport blocks.

a resource mapping unit 1202, which is configured to map the plurality of transport blocks onto time-frequency resources of a plurality of subframes; and a transmitting unit 1203, which is configured to transmit the plurality of subframes.

Alternatively, M transport blocks are crossly mapped onto time-frequency resources of N subframes by the resource mapping unit, and a part of data of K transport blocks are included in time-frequency resources of one subframe, the M, N and K are positive integers, all of which are greater than or equal to 2, and K is less than or equal to M.

Alternatively, data mapped onto same time-frequency resource granularity are data of the same transport block, the time-frequency resource granularity is an RE, a symbol, or a subcarrier.

The resource mapping rules for the different subframes can be same or different.

Alternatively, the coding and modulation unit configures different modulation and coding schemes (MCS) for the plurality of transport blocks.

The time-frequency resources onto which the plurality of transport blocks are mapped are time-frequency resources not occupied by a control channel and a pilot, and can be used for user data transmission.

Preferably, the resource mapping rules are predefined by the transmitting end, or notified to the receiving end by the transmitting end through a high-layer signaling or a physical-layer signaling.

Figure 13:
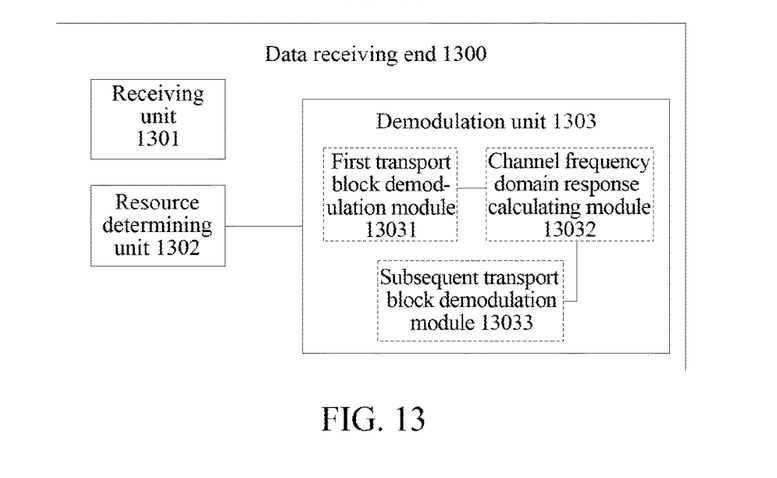
FIG. 13 is a structural schematic diagram of modules of a data receiving end according to the embodiment of the present invention.

Corresponding to the above receiving method, the embodiment of the present invention further provides a data receiving end 1300, as shown in FIG. 13, the receiving end comprises:

a receiving unit 1301, which is configured to receive a plurality of subframes transmitted by a transmitting end;

a resource determining unit 1302, which is configured to determine time-frequency resources onto which a plurality of transport blocks are mapped in the plurality of subframes.

a demodulation unit 1303, which is configured to adopt the iteration algorithm to demodulate the plurality of transport blocks according to the channel frequency domain response.

The demodulation unit in turn demodulates a plurality of transport blocks in the time-frequency resources according to a predetermined demodulation order.

Preferably, as shown in FIG. 13, the demodulation unit comprises:

a first transport block demodulation module 13031, which is configured to demodulate the data of a first transport block in M transport blocks as a predetermined demodulation order according to a channel frequency domain response of a pilot signal.

a channel frequency domain response calculating module 13032, which is configured to code and modulate demodulated data of a current transport block, obtain a channel frequency domain response corresponding to data in the transport block by channel estimation;

a subsequent transport block demodulation module 13033, which is configured to demodulate the data of a next transport block by using the obtained channel frequency domain response until all the transport blocks have been demodulated.

The predetermined demodulation order is an order of modulation and coding schemes (MCS) from low to high, an order predefined by the transmitting end and the receiving end or an order notified by the transmitting end through a signaling.

In the channel frequency domain response calculating module, the receiving end adopts a same precoding matrix and a same MCS with the transmitting end to perform coding and modulating.

The obtained channel frequency domain response includes channel frequency domain response of all demodulated transport blocks and a channel frequency domain response of resources where a pilot is located, which is obtained by channel estimation.

The pilot signal is a cell specific reference signal (CRS) or a demodulation reference signal (DMRS).

Compared with the related art, in the data transmitting and receiving data method provided by the embodiments of the present invention, the transmitting end uses the same precoding matrix to precode the plurality of the transport blocks, which improves the efficiency of the coding and modulation, and improves the system performance of the transmitting end. Meanwhile, the receiving end jointly demodulates the plurality of transport blocks received to improve the system performance, which fully utilizes the performance advantage taking by coding and modulating the plurality of transport blocks simultaneously and demodulating the plurality of transport blocks simultaneously to improve the system performance.

Moreover, in the embodiments of the present invention, the transmitting end crossly maps the plurality of transport blocks onto the time-frequency resources of the plurality of subframes, so that the transmitting end configures the different coding and modulation schemes (MCS) for the plurality of transport blocks, for example, the MCS can be configured according to the changes of the channel environments, which improves the flexibility of the scheduling and the system performance.

It should be noted that the embodiments described above are to illustrate the patent document and not to limit the patent document. Moreover, replacement embodiments may be designed by those skilled in the art without departing from the scope of the appended claims. Each component embodiment of the present invention can be realized by hardware, or realized by software modules running on one or more processors, or realized by their combination. It is should be understood by those skilled in the art that in practice, some or all of functions of some or all of the components in the apparatus in accordance with the embodiments of the present invention may be implemented by using a microcontroller or a digital signal processor (DSP). The patent document also can be realized as device or apparatus programs (for example, the computer program and the computer program product) used for performing part or all of the method described herein. Such programs for realizing the patent document can be stored on the computer readable medium, or it can have a form of one or more signals. Such signals may be downloaded from Internet websites or provided on carrier signals or provided in any other form.

It is should be understood by those skilled in the art that the adaptive changes can be performed on the modules in the devices of the embodiments and the modules can be configured in one or more devices different from those of the embodiment. The modules or units or component in the embodiment can be combined into one module or unit or component, and moreover, they can be divided into a plurality of submodules or subunits or subcomponents. Except that such feature and/or at least some features in the process or units are mutual exclusive, any combination can be used to combine all the features disclosed in the specification (including the accompanied claims, abstract and accompanying drawings) and any method that is so disclosed or all the processes or unit of the devices. Unless otherwise expressly stated, each feature disclosed in the specification can be replaced by the alternate feature providing the same, equivalent or similar purpose. Undeniably, the above alternate modes all should fall within the protection scope of the application.

INDUSTRIAL APPLICABILITY

In the data transmitting and receiving method provided by the embodiments of the present invention, the transmitting end uses the same precoding matrix to precode the plurality of transport blocks, which improves the efficiency of the coding and modulation, and improves the system performance of the transmitting end. Meanwhile, the receiving end jointly demodulates the plurality of transport blocks received to improve the system performance, which fully utilizes the performance advantage taking by coding and modulating the plurality of transport blocks simultaneously and demodulating the plurality of transport blocks simultaneously to improve the system performance.

What is claimed is:

1. A data receiving method, comprising:
   a receiving end receiving a plurality of subframes transmitted by a transmitting end;
   the receiving end determining time-frequency resources onto which a plurality of transport blocks are mapped in the plurality of subframes; and
   the receiving end jointly demodulating a plurality of transport blocks in the time-frequency resources;
   wherein the receiving end jointly demodulating a plurality of transport blocks in the time-frequency resources comprises:
   demodulating a first transport block, demodulating data of a first transport block in M transport blocks as a predetermined demodulation order according to a channel frequency domain response of a pilot signal, wherein M is positive integer which is greater than or equal to 2;
   calculating a channel frequency domain response, coding and modulating demodulated data of a current transport block, obtaining a channel frequency domain response corresponding to data in the transport block by channel estimation;
   demodulating subsequent transport blocks, demodulating data of a next transport block by using the obtained channel frequency domain response; and
   calculating the channel frequency domain response and demodulating the subsequent transport blocks repeatedly until all transport blocks have been demodulated.

2. The method of claim 1, wherein the step of the receiving end jointly demodulating a plurality of transport blocks in the time-frequency resources comprises:
   the receiving end in turn demodulating the plurality of transport blocks in the time-frequency resources according to a predetermined demodulation order.

3. The method of claim 1, wherein the step of the receiving end jointly demodulating a plurality of transport blocks in the time-frequency resources comprises:
   the receiving end jointly demodulating the plurality of transport blocks in the time-frequency resources according to an order of modulation and coding schemes (MCS) form low to high, an order predefined by the transmitting end and the receiving end or an order notified by the transmitting end through a signaling.

4. The method of claim 1, wherein the step of demodulating data of a next transport block by using the obtained channel frequency domain response comprises:
   demodulating data of a next transport block by using channel frequency domain responses of all demodulated transport blocks and a channel frequency domain response of resources where a pilot is located, which is obtained by channel estimation, preferably the pilot signal is a cell specific reference signal (CRS) or a demodulation reference signal (DMRS).

5. The method of claim 1, wherein the step of calculating a channel frequency domain response comprises: the receiving end adopting a same precoding matrix and a same MCS with the transmitting end to perform coding and modulating.

6. A data receiving end, comprising at least one processor configured to executing a receiving unit, a resource determining unit and a demodulation unit, wherein:
   the receiving unit is configured to receive a plurality of subframes transmitted by a transmitting end;
   the resource determining unit is configured to determine time-frequency resources onto which a plurality of transport blocks are mapped in the plurality of subframes; and
   the demodulation unit is configured to jointly demodulate a plurality of transport blocks in the time-frequency resources;
   wherein the demodulation unit comprises:
   a first transport block demodulation module, configured to demodulate data of a first transport block in M transport blocks as a predetermined demodulation order according to a channel frequency domain response of a pilot signal, wherein M is positive integer which is greater than or equal to 2;
   a channel frequency domain response calculating module, configured to code and modulate demodulated data of a current transport block, obtain a channel frequency domain response corresponding to data in the transport block by channel estimation; and
   a subsequent transport block demodulation module, configured to demodulate data of a next transport block by using the obtained channel frequency domain response until all transport blocks have been demodulated.

7. The receiving end of claim 6, wherein the demodulation unit is configured to jointly demodulate a plurality of transport blocks in the time-frequency resources by:
   the demodulation unit in turn demodulating the plurality of transport blocks in the time-frequency resources according to the predetermined demodulation order.

8. The receiving end of claim 6, the demodulation unit is configured to jointly demodulate a plurality of transport blocks in the time-frequency resources by:
   jointly demodulate the plurality of transport blocks in the time-frequency resources according to an order of modulation and coding schemes (MCS) form low to high, an order predefined by the transmitting end and the receiving end or an order notified by the transmitting end through a signaling.

9. The receiving end of claim 6, wherein
   the subsequent transport block demodulation module is configured to demodulate data of a next transport block by using channel frequency domain responses of all demodulated transport blocks and a channel frequency domain response of resources where a pilot is located, which is obtained by channel estimation, and the pilot is a cell specific reference signal (CRS) or a demodulation reference signal (DMRS);
   or
   the channel frequency domain response calculating module is configured to code and modulate demodulated data of a current transport block by: adopting a same precoding matrix and a same MCS with the transmitting end to perform the coding and modulating.

* * * * *